(12) United States Patent
Petit et al.

(10) Patent No.: US 10,864,396 B2
(45) Date of Patent: Dec. 15, 2020

(54) PORTABLE MONITOR CONTROL SYSTEM

(71) Applicant: AKRON BRASS COMPANY, Wooster, OH (US)

(72) Inventors: Kevin J. Petit, Wooster, OH (US); Jon A. Jenkins, Wooster, OH (US)

(73) Assignee: AKRON BRASS COMPANY, Wooster, OH (US)

( * ) Notice: Subject to any disclaimer, the term of this patent is extended or adjusted under 35 U.S.C. 154(b) by 24 days.

(21) Appl. No.: 16/289,533

(22) Filed: Feb. 28, 2019

(65) Prior Publication Data

US 2019/0262642 A1    Aug. 29, 2019

Related U.S. Application Data

(60) Provisional application No. 62/636,479, filed on Feb. 28, 2018.

(51) Int. Cl.

| | |
|---|---|
| *F16K 17/36* | (2006.01) |
| *A62C 31/02* | (2006.01) |
| *F16K 31/60* | (2006.01) |
| *A62C 31/24* | (2006.01) |
| *F16K 31/56* | (2006.01) |
| *B05B 12/08* | (2006.01) |

(52) U.S. Cl.
CPC .............. *A62C 31/02* (2013.01); *A62C 31/24* (2013.01); *F16K 17/36* (2013.01); *F16K 17/363* (2013.01); *F16K 31/56* (2013.01); *F16K 31/563* (2013.01); *F16K 31/60* (2013.01); *B05B 12/08* (2013.01); *Y10T 137/0753* (2015.04); *Y10T 137/0923* (2015.04)

(58) Field of Classification Search
CPC ............ Y10T 137/0923; Y10T 137/753; F16K 31/60; F16K 31/563; F16K 31/56; F16K 17/363; F16K 17/36; A62C 31/28; A62C 31/24; A62C 31/02; B05B 12/08
USPC .............. 251/66, 73, 74, 114, 286, 297, 305; 137/38, 45; 239/587.4, 579
See application file for complete search history.

(56) References Cited

U.S. PATENT DOCUMENTS

| | | | | |
|---|---|---|---|---|
| 4,004,601 | A | * | 1/1977 | Bachelder ............. F16K 17/383 137/77 |
| 5,249,632 | A | * | 10/1993 | Sparling ............... B05B 15/654 169/52 |
| 5,325,881 | A | * | 7/1994 | Hunter .................... F16K 17/36 137/39 |
| 5,351,706 | A | * | 10/1994 | Banks ................... F16K 17/363 137/38 |

(Continued)

*Primary Examiner* — Matthew W Jellett
(74) *Attorney, Agent, or Firm* — Tucker Ellis LLP; Michael Craig

(57) ABSTRACT

One or more techniques and/or systems are disclosed that can provide for a portable monitor control. A movement detection triggering system can be disposed between a fluid inlet and the body of the portable monitor, and may be able to restrict or reduce fluid flow when the monitor is moved from its desired position. A trigger arm can be coupled with the inlet, and, when the inlet is pivoted away from a set position, the trigger arm is also moved, which triggers another portion of the control system. A trigger pin is released, which may allow a lever to rotate, allowing a restrictor component to move into place in the fluid flow path, thereby restricting fluid flow.

20 Claims, 15 Drawing Sheets

(56) References Cited

U.S. PATENT DOCUMENTS

| | | | | |
|---|---|---|---|---|
| 5,593,092 A * | 1/1997 | McMillan | ............... | B05B 15/62 239/285 |
| 6,305,621 B1 * | 10/2001 | Kolacz | ................... | A62C 31/24 169/24 |
| 6,354,320 B1 * | 3/2002 | Kolacz | ................... | A62C 31/24 137/38 |
| 6,745,957 B2 * | 6/2004 | Parey | ..................... | A62C 31/24 137/459 |
| 7,644,777 B2 * | 1/2010 | Combs | ................... | B05B 15/65 169/52 |
| 8,844,642 B2 * | 9/2014 | Combs | ................... | A62C 31/03 169/20 |

* cited by examiner

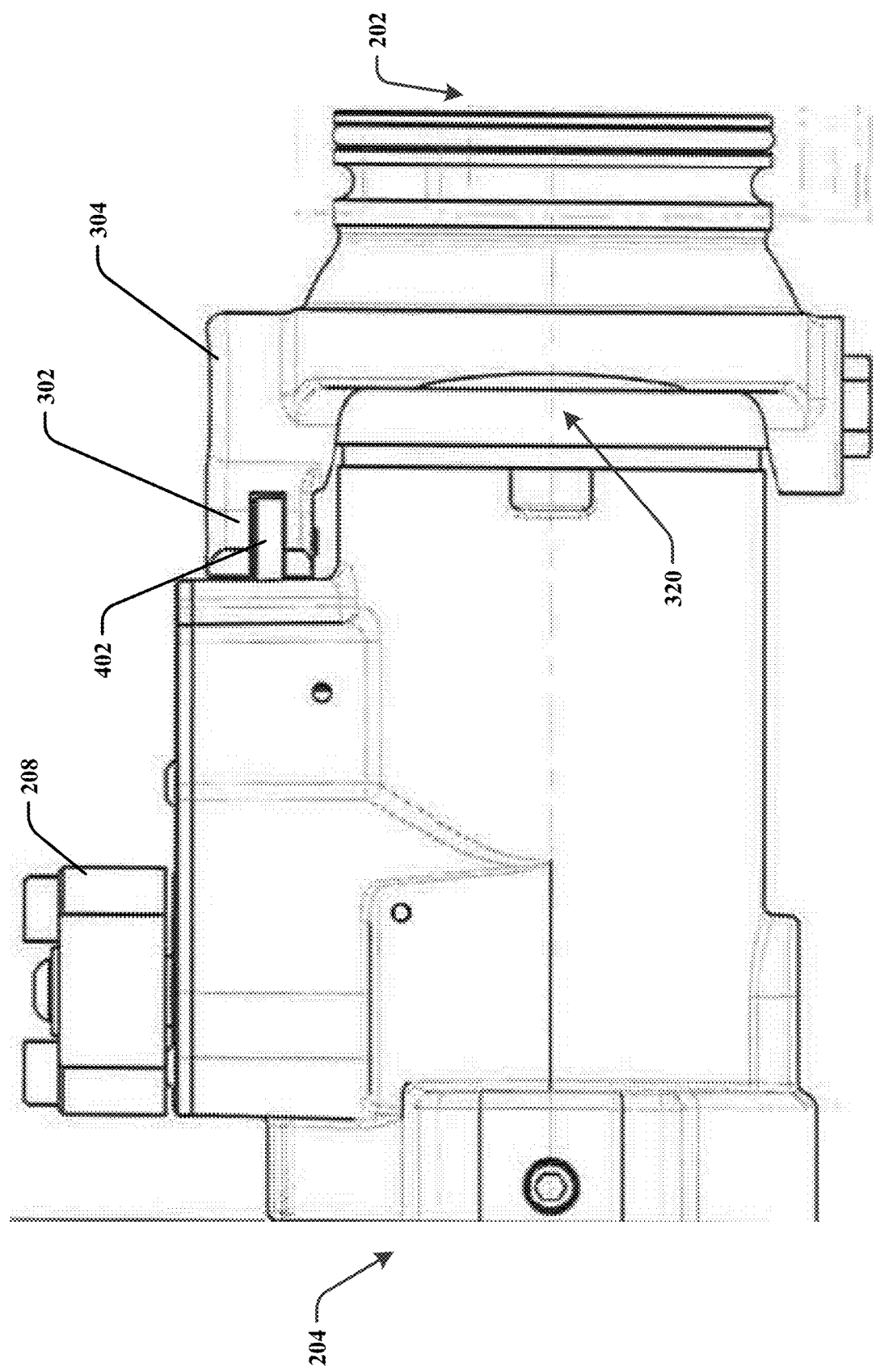

PORTABLE MONITOR CONTROL SYSTEM

RELATED APPLICATIONS

This application claims priority to U.S. Ser. No. 62/636,479, entitled PORTABLE MONITOR CONTROL SYSTEM, filed Feb. 28, 2018, which is incorporated herein by reference.

BACKGROUND

Portable fluid monitors can deliver large amounts of water and other fluids to fires and other target scenarios. They are typically placed on the ground or other appropriate surface and connected to a fluid source, such as a fire truck pumper, by way of a fire hose. Recommended practice has a portable monitor restrained by tethering it to a structure, such as a fire hydrant, utility pole or the like. The restraint is utilized to help maintain the position of the water monitor should the friction between the ground and monitor prove to be insufficient to resist monitor movement caused by the reaction force associated with the fluid exiting the monitor. Periodically, monitor users tend to deviate from recommended practices due to the lack of a suitable restraint structure or other reasons. In these cases, an unrestrained monitor may move from the desired location and/or target, and directing the fluid stream toward an undesired position.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein that can aid in portable monitor control, which may be used in combination with a tethering device. In one implementation, such a system, when triggered, may reduce the flow of fluid from the monitor outlet, which can reduce the opposing reaction force against the monitor. For example, if the monitor moves from its set position, the system may be triggered and the fluid flow output to the monitor can be reduced, which should reduce the opposing reaction force, thereby mitigating the potential undesired effects associated with unrestrained output of fluid at a high rate.

In one implementation of system for improving control of a portable fluid monitor, a trigger body can be operably disposed distally from, and fluidly coupled with, a portable monitor fluid inlet in a pivotable arrangement. Further, a trigger pin can be operably disposed in the trigger body, where the trigger pin normally biased toward the fluid inlet by a biasing component, and the trigger pin sized to extend out of the trigger body. Additionally, a trigger arm can be fixedly engaged with the fluid inlet, where the distal end of the trigger arm is operably engagable with a proximal end of the trigger pin to place the trigger pin in a set position that extends a distal end of the trigger pin from a distal end of the trigger body to provide a lever arm stop. In this implementation, a restrictor component can be operably disposed between the trigger body and the body of the portable monitor.

The restrictor component can comprise a flow restrictor that is disposed in a path of fluid flow. The restrictor component can also comprise an axel shaft fixedly coupled with the flow restrictor and disposed along an axis of rotation that is substantially perpendicular to the direction of fluid flow. A restrictor lever arm can be fixedly engaged with the axel shaft with a center of rotation at the axis of rotation. The lever arm may be stopped from rotation when the trigger pin in disposed in the set position, and allowed to rotate when the trigger pin in disposed in a triggered position. The triggered position can occur when the trigger arm is pivoted away from the set position.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIGS. 3A, 3B, 3C, and 3D are component diagrams illustrating one implementation of one or more portions of one or more systems described herein.

DETAILED DESCRIPTION

Figure 1A:
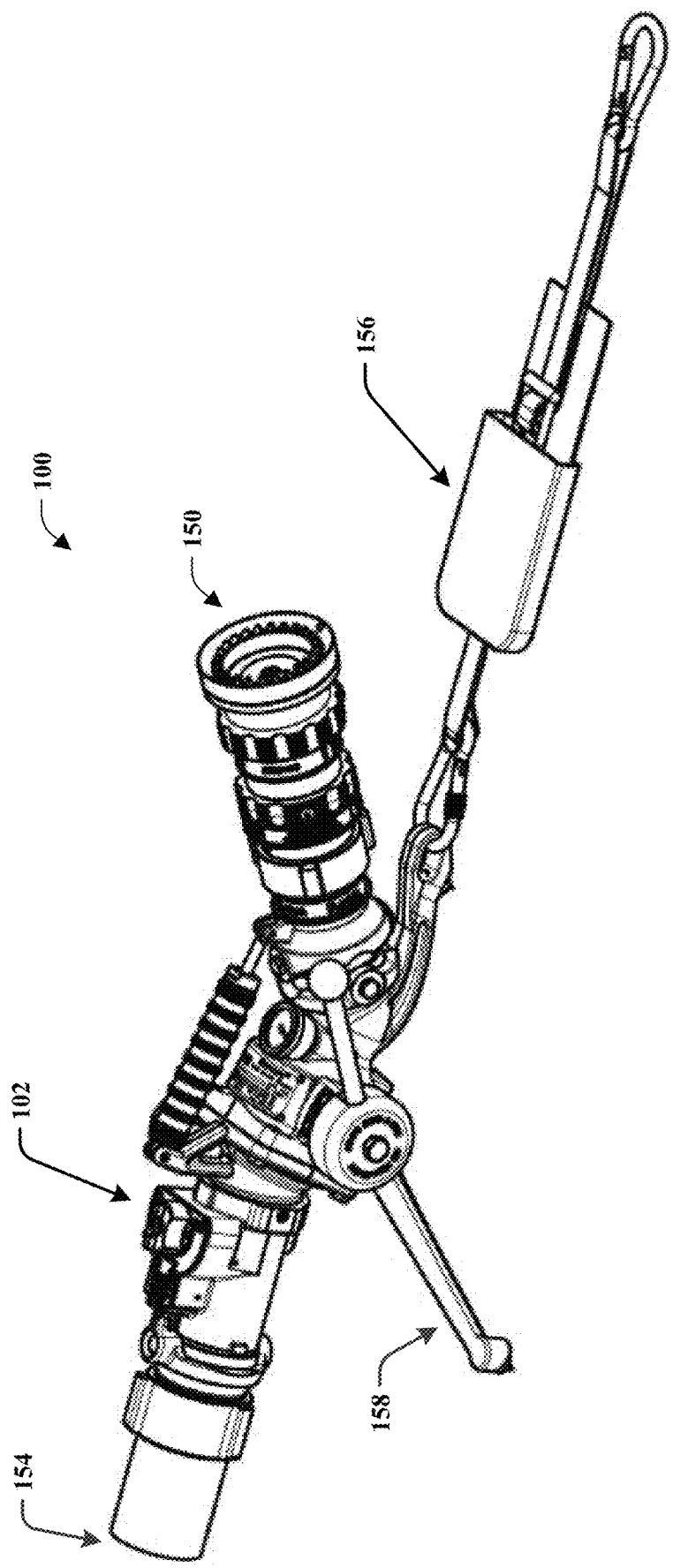
FIGS. 1A and 1B are component diagrams illustrating one implementation of an exemplary system for portable monitor control.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, a portable fluid monitor may move from a desired position and/or target when not appropriately restrained, for example, due to the amount of force utilized to propel fluid from the monitor. For example, an unrestrained monitor may be moved or propelled from its initial point of aim or location by the reaction force associated with the fluid exiting the monitor.

Existing techniques for mitigating this type of movement include attaching a tether to the monitor. Other methods that were previously used include an inertia trigger that can detect acceleration of the monitor from rest, resulting from movement of an internal mass. The movement of the internal mass releases a mechanism that reduces fluid flow in the monitor. Another method uses a mechanism whose operation is initiated by relative movement between the monitor and ground. These prior systems also released a mechanism which reduces fluid flow to the monitor.

A system may be devised, and described herein, that aids in maintaining a position and/or target of a portable monitor, for example, which may be used in combination with a tethering device. In one implementation, in this aspect, a system may be devised that reduces the flow of fluid from the monitor outlet, thereby reducing the opposing reaction force against the monitor. That is, for example, if the monitor moves from its set position, the system may be triggered and the fluid flow output to the monitor can be reduced. In this example, the reduction of the fluid flow output should reduce the opposing reaction force, thereby mitigating the potential movement of the portable monitor further from the set position.

In this aspect, portable monitors use a fire hose to supply fluid to the monitor. Models currently available have the hose connected to the monitor inlet so that rotation is mitigated in a horizontal plane (e.g., or about a vertical axis) between the hose and monitor. In one implementation, in this aspect, the system described herein can permit rotation of this type (e.g., horizontally and or vertically), and can use such rotation to automatically trigger reduction of the fluid flow (e.g., and associated reaction force) to a different level, for example. As an example, during normal operation there is typically no movement of the monitor, and no such rotation, as water flow continues unabated. In one example, rotation away from center may occur during monitor movement, which, in turn, can be used to trigger the device described herein.

Figure 1B:
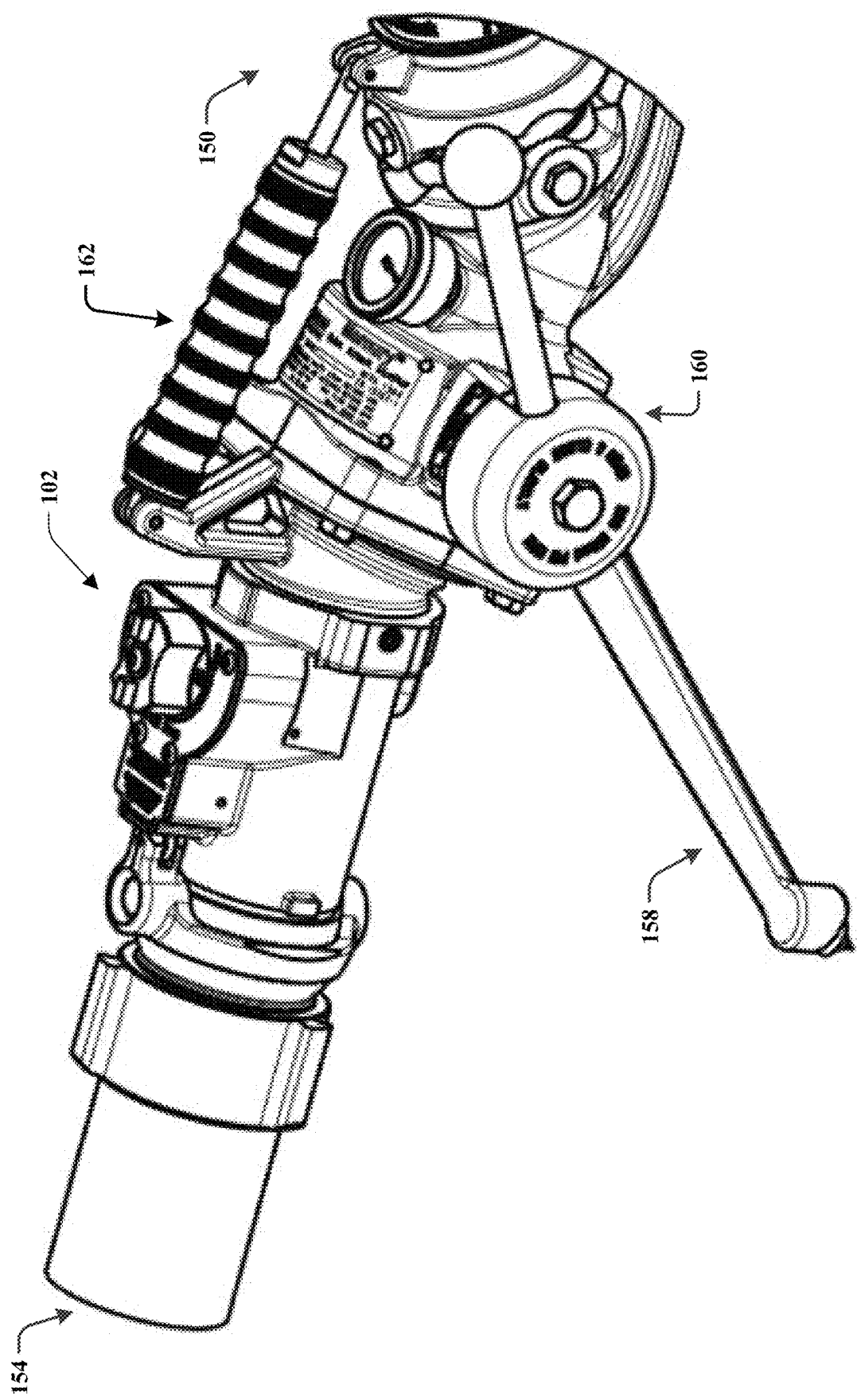

FIGS. 1A and 1B are component diagrams illustrating one implementation of an example system 100 for providing a portable monitor control. In FIGS. 1A and 1B, an example monitor 150 is a fluid outlet for water or other fluid. The monitor 150 has an inlet 154 through which the fluid is provided. Often, an anchor 156 device is used to secure the monitor 150 to a surface on which the monitor is disposed, such as the ground, a vehicle or the like. One of more feet 158 can be used to stabilize the monitor 150 in place during use. In this implementation, the exemplary system 100 comprises a portable monitor control device 102, which is fluidly coupled between the inlet 154 and the monitor 150. Further, a fluid control 160 can be used to control the flow of fluid through the monitor 150; and a stabilizer 162 can be used to hold and/or aim the outlet of the monitor 150.

Figure 2:
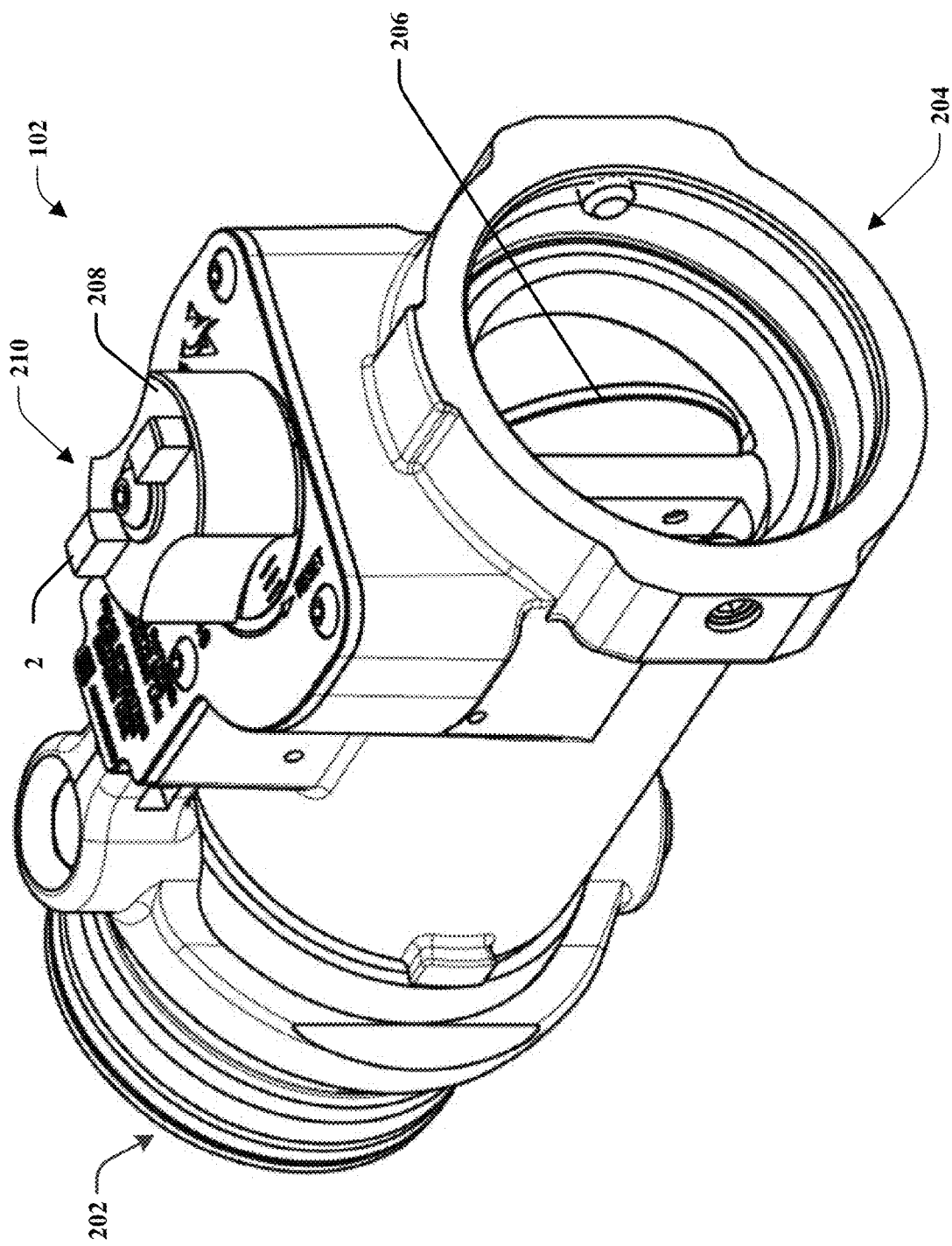
FIG. 2 is a component diagrams illustrating one implementation of one or more portions of one or more systems described herein
Figure 3A:
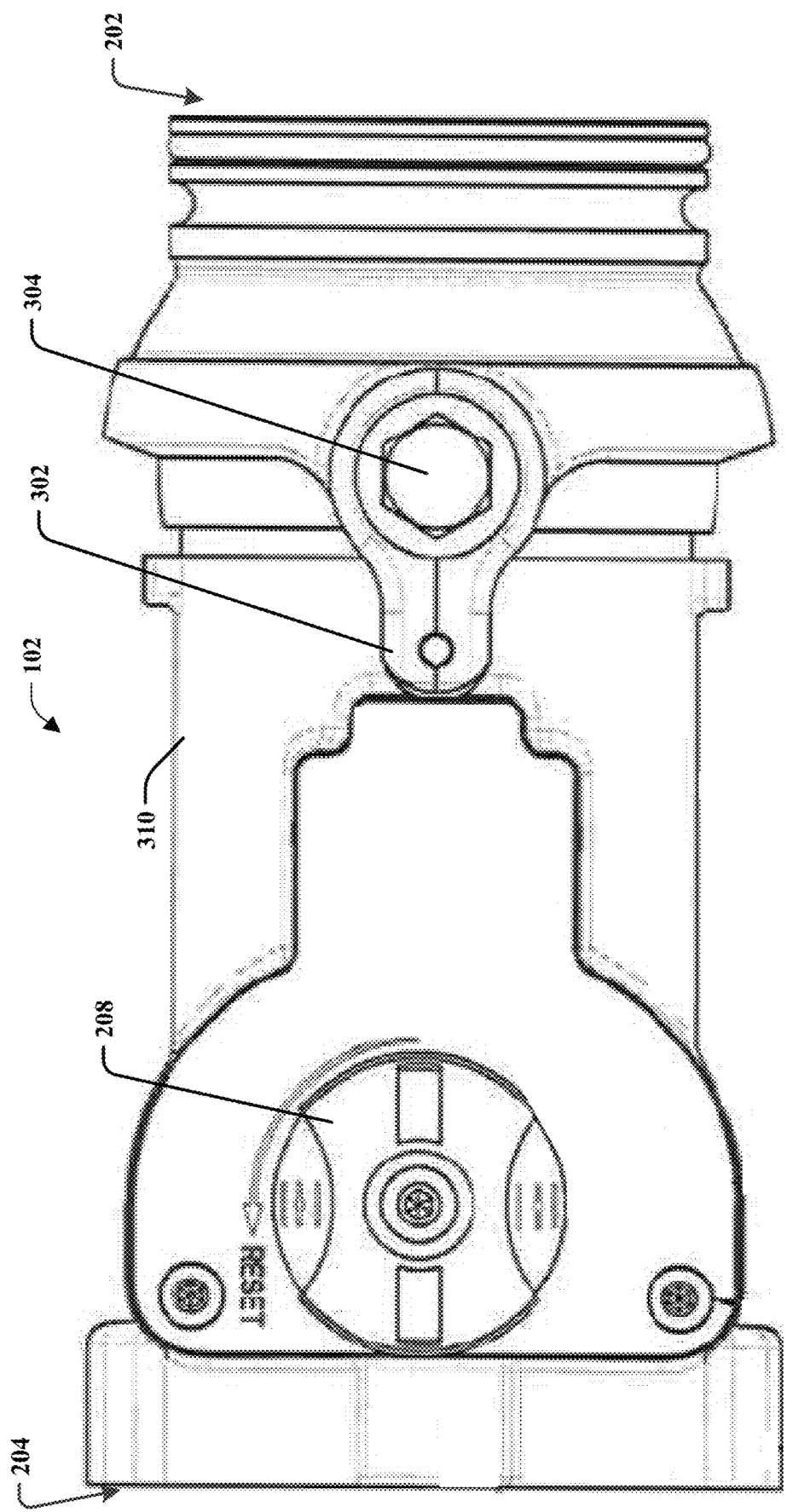
Figure 3B:
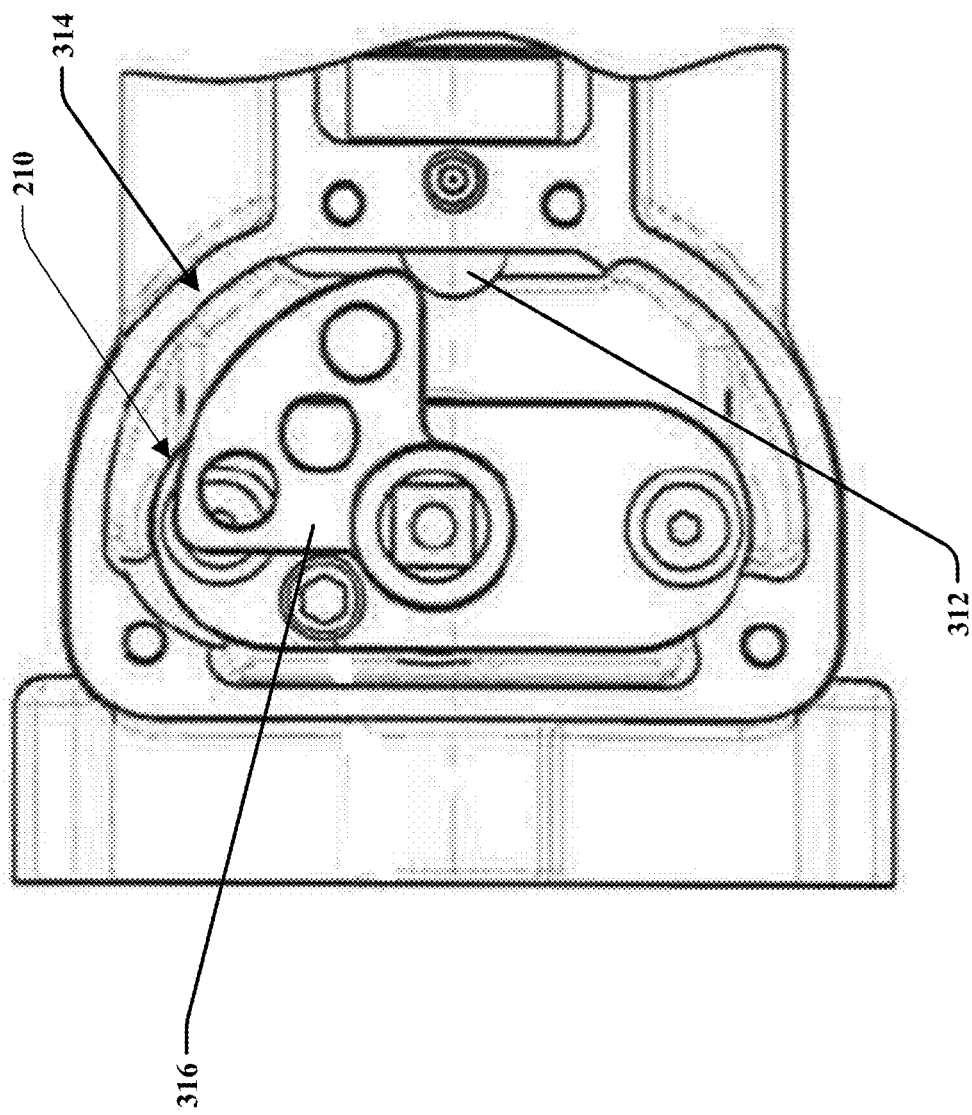
Figure 3D:
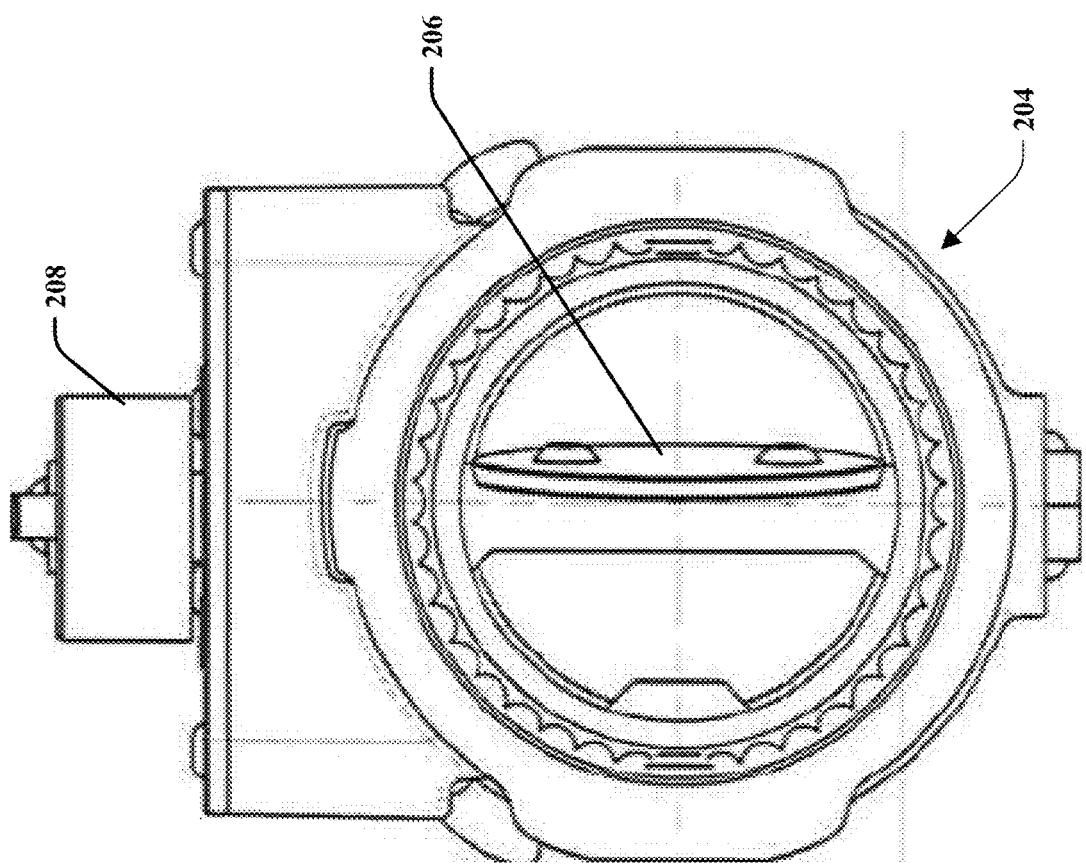
Figure 4A:
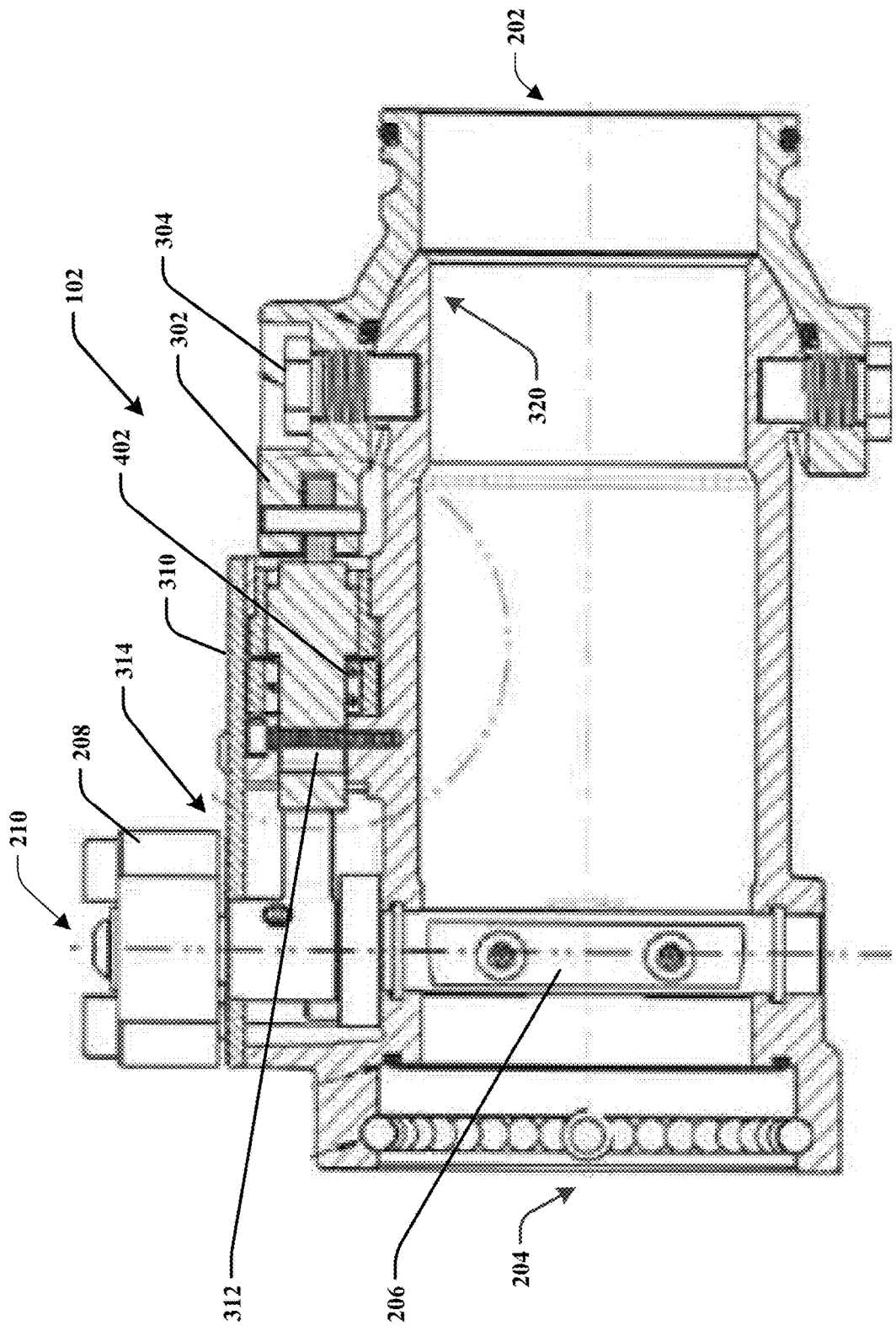
FIGS. 4A, 4B, and 4C are component diagrams illustrating one implementation of one or more portions of one or more systems described herein.
Figure 4B:
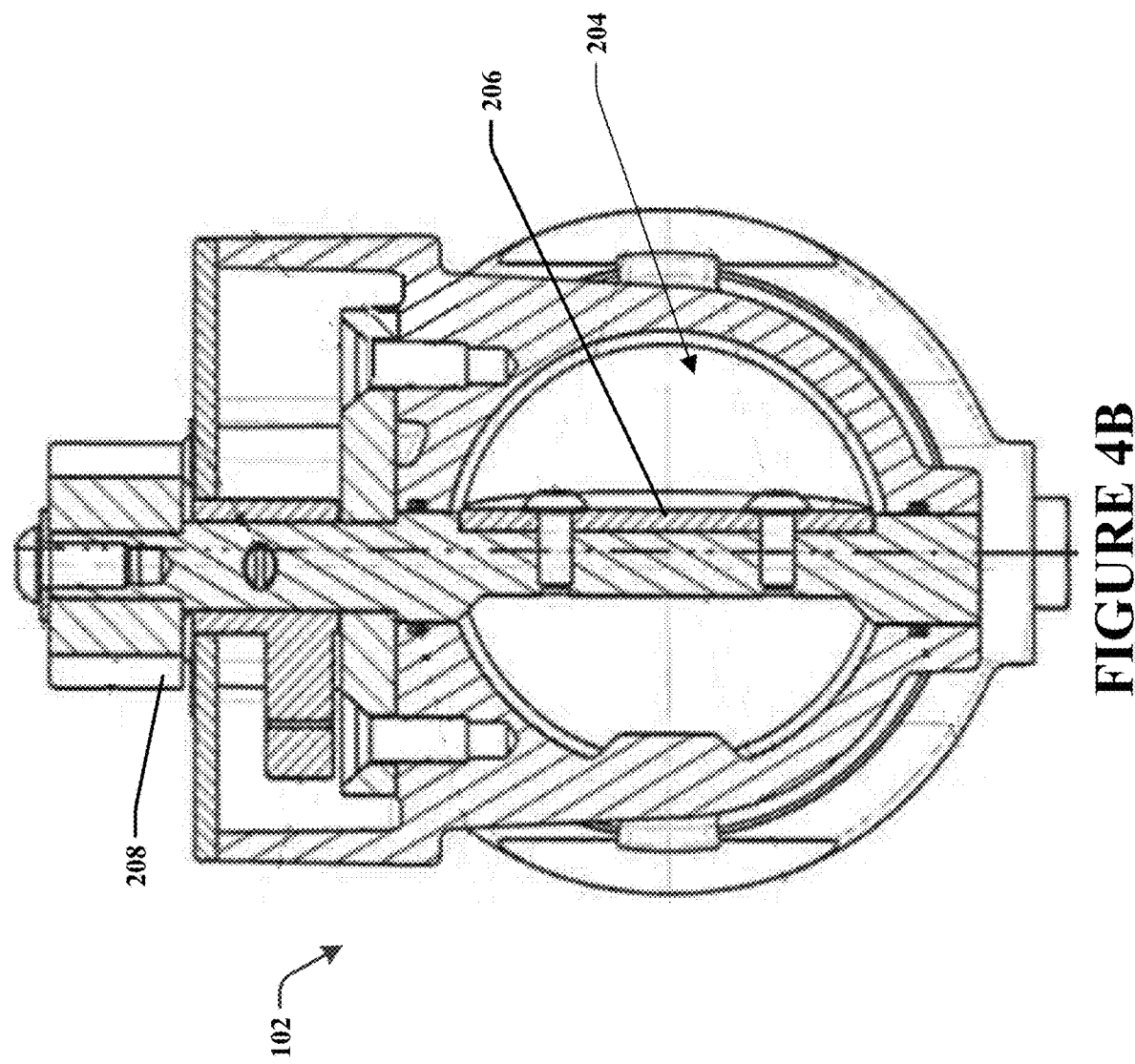
Figure 4C:
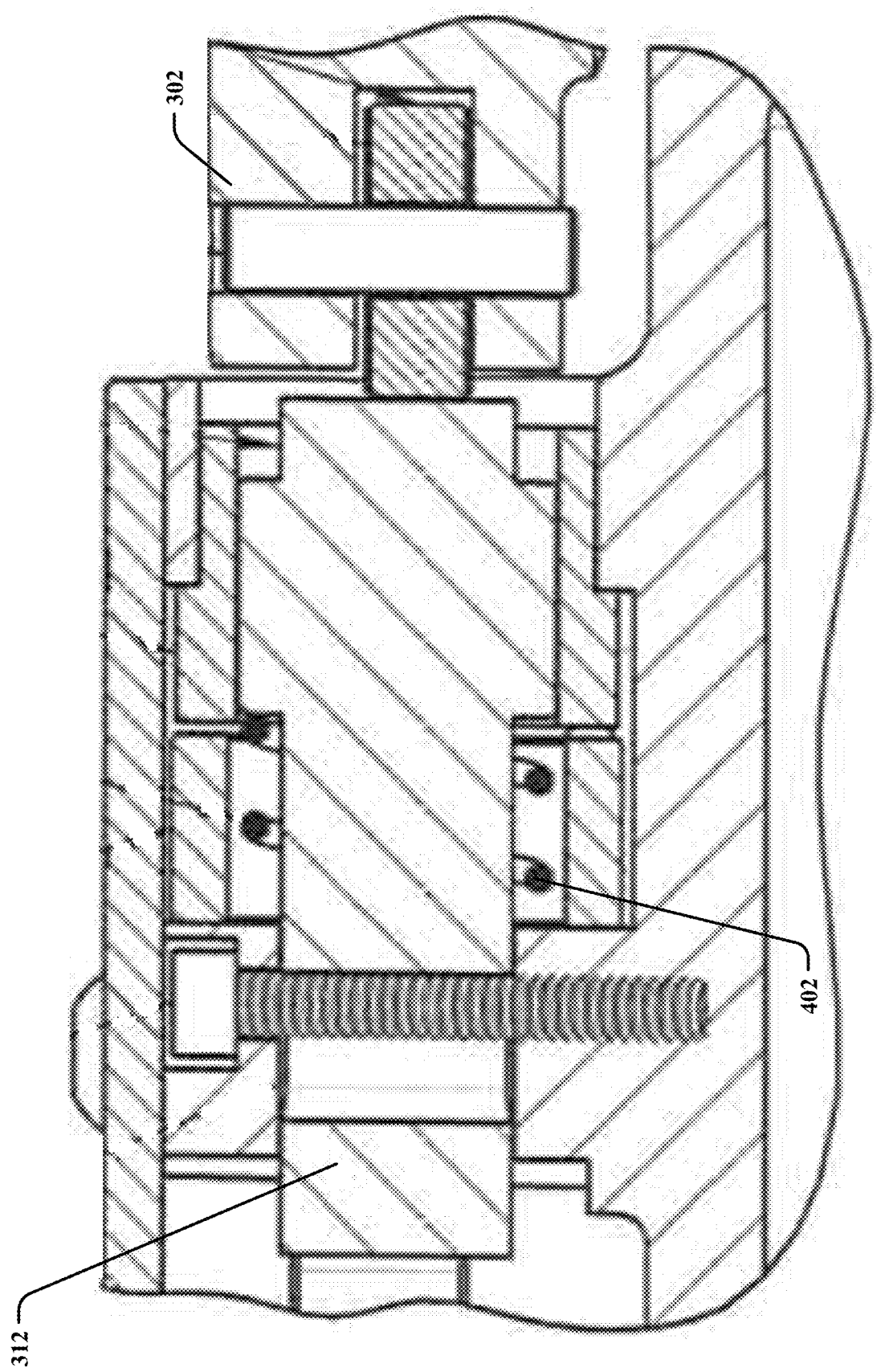
Figure 5:
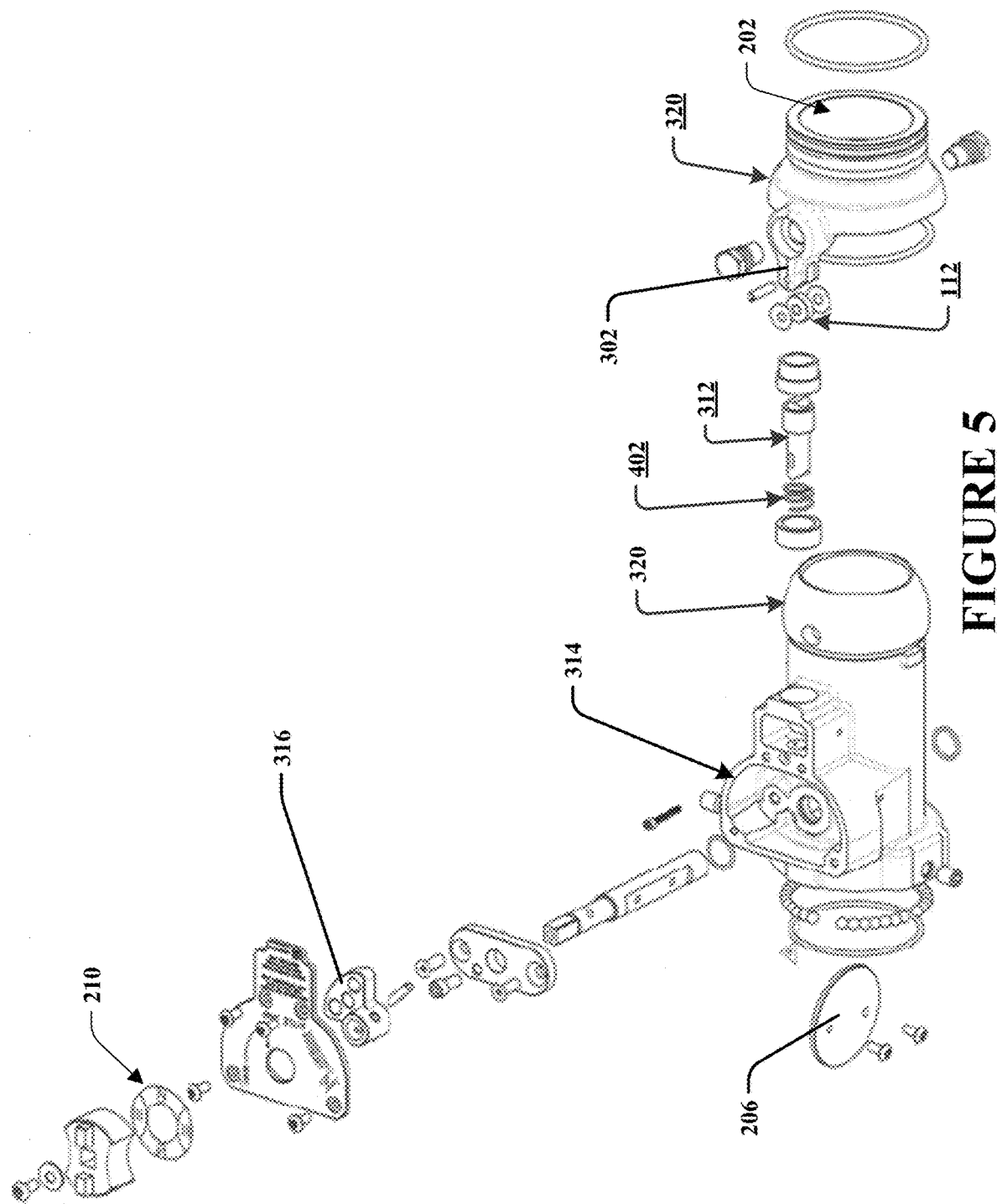
FIG. 5 is a component diagrams illustrating one implementation of one or more portions of one or more systems described herein.

FIG. 2 is a component diagram illustrating a perspective view of the monitor control device 102. The monitor control device 102 can act as a flow restrictor when triggered, such as when movement of the monitor out of a predetermined range of movement, is detected. The monitor control device 102 comprises an inlet 202 fluidly coupled with the monitor inlet 154, and an outlet 204 fluidly coupled with the monitor 150. A restrictor plate 206 (e.g., a butterfly disk or the like) can allow fluid flow in an open position, and restrict fluid flow in a closed position.

A manual control knob 208 can be used to reset the device to an active position, such as upon set up, and/or after activation. An indicator 210 can provide a visual indication when the control device 102 has been activated (e.g., restriction of flow), and when the device 102 is set (e.g., in normal fluid flow operation). As an example, the indicator may display red (or some other appropriate color) when activated, and green when set. The knob 208 can comprise raised portions (e.g., ribs) that can also be used as a visual and tactile indicator. For example, when the restrictor plate 206 is disposed in an open position the ribs may be disposed inline with the fluid flow; and when the ribs are offset from the line of flow, this can be an indication that the restrictor plate 206 is in a closed position (e.g., the device has been activated or triggered).

As illustrated in FIGS. 3A, 3B, 3C, 3D, 4A, 4B, 4C, and 5, with continued reference to FIG. 1-2, the example monitor control device 102 can comprise a trigger 302 that is fixedly engaged with the inlet 202. In one implementation, the trigger 302 can be engaged with a trunnion 304 disposed on a portion of the inlet 202. For example, the trigger 302 can be operably coupled with the trunnion 304 at a base portion of the trigger 302 that is engaged with the inlet 202. Further, as illustrated, the trigger 302 can be coupled with the inlet portion of monitor at a proximal end of the trigger 302. In this way, for example, with the proximal end of the trigger 302 operably disposed in a fixed engagement with the inlet 202, and pivotably engaged with the trunnion 304, the trigger 302 may be able to rotate relative to the inlet 202. That is, for example, the inlet 202 of the monitor 150 may be disposed in a pivotable 320 (e.g., ball and socket) arrangement with a trigger body portion 310 of the device 102. In this example, if the inlet portion 202 pivots from a centrally aligned arrangement (e.g., horizontally or vertically) with the trigger body portion 310, the trigger 302 can also pivot away from the central alignment. In one implementation, a distal end of the trigger 302, which engages with the proximal end of the trigger 302, can comprise a component that provides for a desirable amount of friction, or lack thereof. That is, as an example, a roller component 322 may be utilized to allow disengagement under appropriate conditions. Other types of engagement components may be used, including different materials, bearings, etc. that allows for a desired resistance for the application.

Further, the exemplary device 102 can comprise a trigger pin 312 disposed in the housing body 314. Further, a biasing force may be applied to the trigger pin 312 in the direction opposite the flow of fluid (e.g., toward the monitor inlet). The biasing force may be applied by a biasing component 402, such as a spring, clip, or other appropriate force application component. As an example, the biasing component can be operably disposed in the trigger body, and operably engaged with the trigger pin 312 in the housing to apply to biasing force toward the inlet. In this way, for example, the trigger pin 312 will tend to be driven toward the inlet portion 202 of the monitor, absent some stop that mitigates the pin movement. In that way, when the trigger moves away from center, for example, the trigger pin 312 will be forced toward the inlet, and a control arm 316 can rotate past the location of the trigger pin 312. The control arm 316 can be fixedly engaged with the restrictor plate 206, and rotate the restrictor plate 206 between open and closed. That is, for example, when the device 102 is set (open fluid flow) the trigger pin holds the control arm 316 in an open position. In this example, when the trigger pin 312 is forced toward the inlet, the control arm 316 rotates, which rotates the restrictor plate to a closed position (e.g., rotates clockwise in FIG. 3B).

Figure 6:
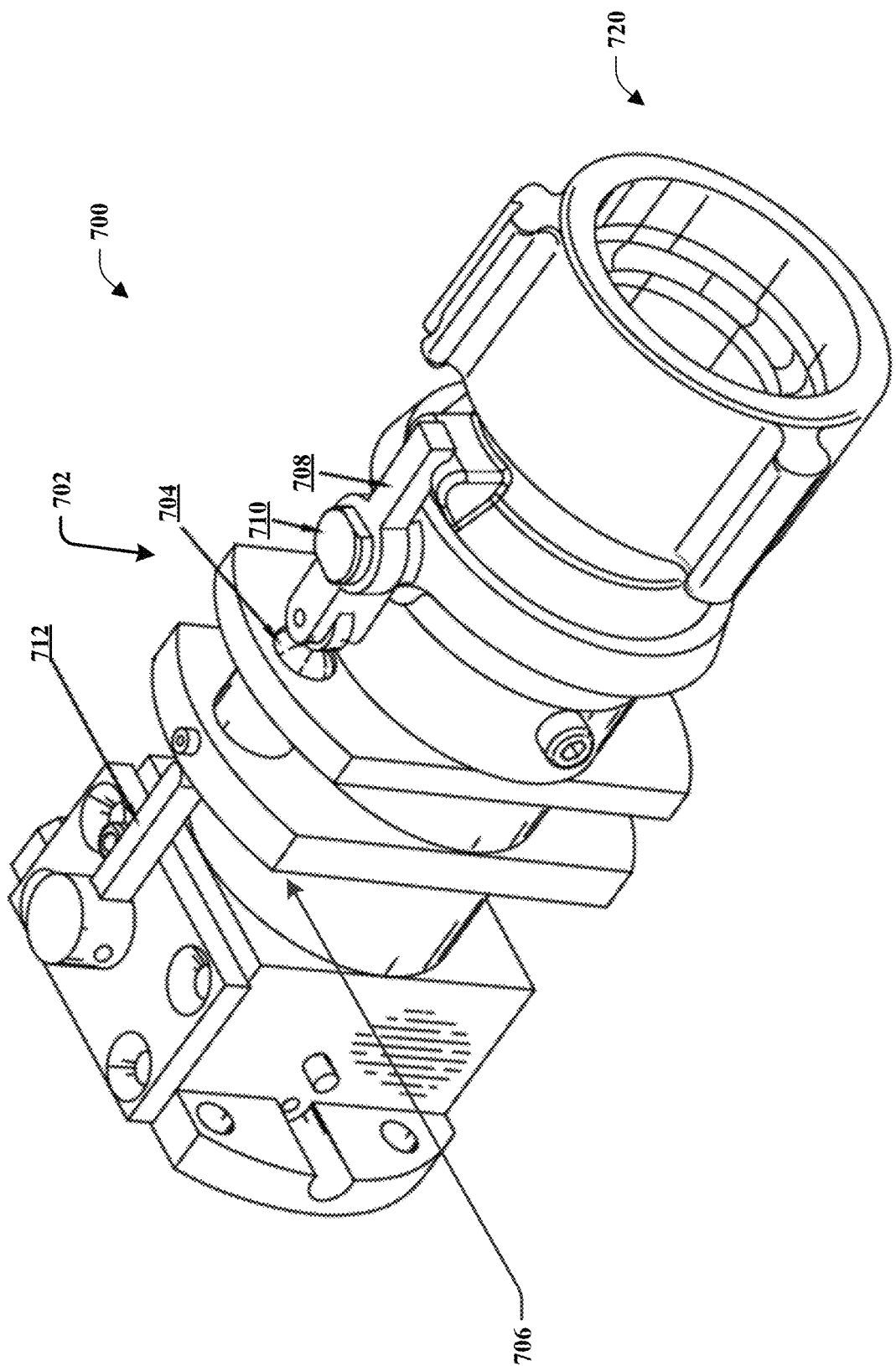
FIGS. 6 and 7 are component diagrams illustrating an alternate implementation of an exemplary system for portable monitor control.
Figure 7:
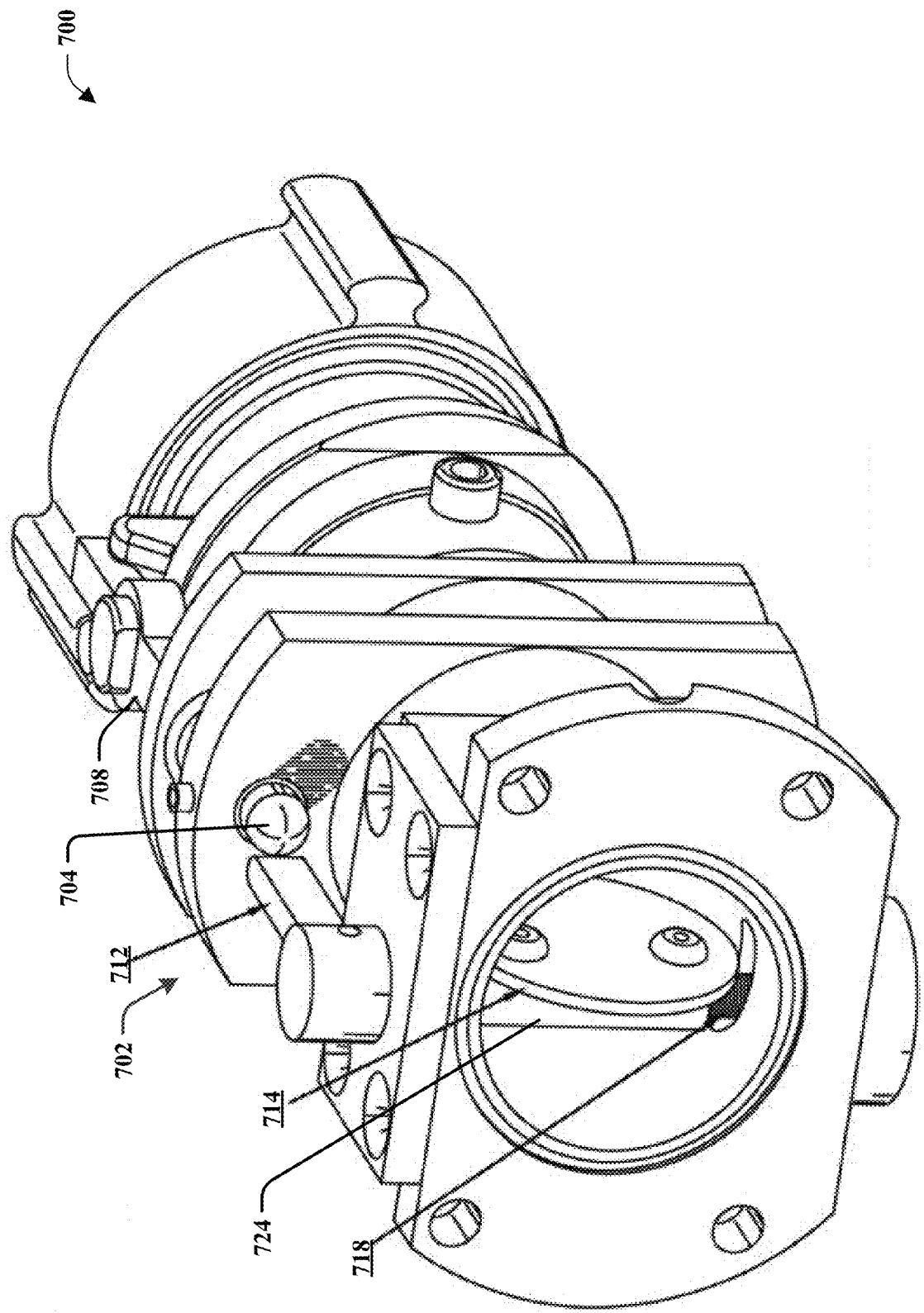

FIGS. 6 and 7 are component diagrams illustrating another implementation of an example system 700 for providing a portable monitor control. In this implementation, the rotation of the monitor away from center can be detected and used to trigger fluid flow reduction. The example, system 700 can comprise a trigger body 702 that houses one or more parts of the trigger mechanism. The exemplary system 700 can comprise a trigger pin 704 disposed in the housing body 706. Further, a biasing force may be applied to the trigger pin 704 in the direction opposite the flow of fluid (e.g., toward the monitor inlet). The biasing force may be applied by a biasing component, such as a spring, clip, or other appropriate force application component. As an example, the biasing component can be operably disposed in the trigger body 702, and operably engaged with the trigger pin 704 in the housing 706 to apply to biasing force toward the inlet 720. In this way, for example, the trigger pin 704 will tend to be driven toward the inlet portion of the monitor, absent some stop that mitigates the pin movement.

As illustrated in FIG. 6, the exemplary system 700 can comprise a trigger arm 708, which can be fixedly engaged with the inlet 720. In one implementation, the trigger arm 708 can be engaged with a trunnion 710 disposed on a portion of the inlet 720. For example, the trigger arm 708 can be operably coupled with the trunnion 710 at a central portion of the trigger arm 708. Further, as illustrated, the trigger arm 708 can be coupled with the inlet portion of monitor at a proximal end of the trigger arm 708. In this way, for example, with the proximal end of the trigger arm 708 operably disposed in a fixed engagement with the inlet portion, and centrally, pivotably engaged with the trunnion 710, the trigger arm 708 may be able to rotate relative to the trigger body 702. That is, for example, the inlet portion 720 of the monitor may be disposed in a pivotable (e.g., ball and socket) arrangement with the trigger body 702 portion of the monitor. In this example, if the inlet portion 720 pivots from a centrally aligned arrangement (e.g., horizontally or vertically) with the trigger body 702 portion, the trigger arm 708 can also pivot away from the central alignment. In one implementation, a distal end of the trigger arm 708, which engages with the proximal end of the trigger pin 704, can comprise a component that provides for a desirable amount of friction, or lack thereof. That is, as depicted, a roller component may be utilized to allow disengagement under appropriate conditions. Other types of engagement components may be used, including different materials, bearings, etc. that allows for a desired resistance for the application.

In FIGS. 6 and 7, the exemplary system can comprise a restrictor lever arm 712 that is operably engaged with a flow restrictor 714 disposed in the flow path of the fluid flow between the fluid inlet and the body of the monitor. As one example, the flow restrictor 714 may be a valve such as a butterfly valve that restricts the flow of fluid in a closed position (e.g., or at least partially closed positions). In one exemplary implementation, the restrictor lever arm 712 can be operably coupled with a butterfly-style disk that is disposed in the fluid flow between the fluid inlet and the body of the monitor. In a first position (e.g., generally, or at least mostly, open), the butterfly-style disk can allow substantially unabated flow of the fluid from the inlet to the monitor body; and in a second position (e.g., generally, or at least partially, closed), the butterfly disk may restrict flow of the fluid from the inlet to the monitor body. Further, in one implementation, the restrictor lever arm 712 can be disposed in a first position (e.g., open) and a second position (e.g., closed), which respectively correspond the first and second positions of the butterfly disk.

In this implementation, as an example, the butterfly disk is disposed in the fluid flow. When disposed with a proximal face toward an axel (e.g., as pictured, the axis of rotation of the disk and restriction lever arm), the force of the fluid flow against the butterfly disk tends to act upon the disk surface to cause it to rotate to the closed (second position). That is, for example, during operation, with fluid flowing, the default position of the butterfly disk (e.g., and hence the restrictor lever arm) would be the second position (e.g., closed). In this implementation, to set the exemplary control system 700 in a desired operational position, the distal end of the trigger pin 704 is extended out of the distal end of the trigger body 702, thereby engaging the restrictor lever arm 712, and acting as a stop. That is, the extension of the trigger pin 704 stops the restrictor lever arm 712 from rotating past the trigger pin 704, which, in turn stops the butterfly disk from rotating to the second position, in operable flow.

As an illustrative example, in FIGS. 6 and 7, the example trigger assembly device (e.g., 700) is shown in a desired operating position for a fluid flow condition from the inlet to the monitor body. In this illustrative example, during operation the restrictor lever arm 712 is held in the first or "open" position, as shown by the position of the trigger pin 704 extending from the distal end of the trigger body 702. In this example, if not for the illustrated and operable disposition of the trigger pin 704, the restrictor lever arm 712 would rotate and to the second or "closed" position, due to fluid flow forces applied to the butterfly disk by the water flowing past the disk. Alternately, in one implementation, a torsion spring 718 may be operably engaged with the axel (e.g., or butterfly disk), and apply a rotational biasing force to the butterfly disk. In this implementation, the biasing force of the torsion spring 718 can move the restrictor lever arm 712 (e.g., and butterfly disk) to between the first and second positions. In another implementation, the force of the fluid flow combined with the biasing force of the torsion spring 718 may be able to move the restrictor lever arm 712 (e.g., and butterfly disk) to between the first and second positions.

Further, in this illustrative example, the trigger pin 704 can be spring loaded, biasing the pin away from the restrictor lever arm 712. As illustrated, the trigger pin 704 is held in the position, against the biasing force of the trigger biasing component, as shown, by the trigger arm 708, which keeps the biasing component compressed. As shown in FIG. 7, in this illustrative example, the butterfly disk can be seen in the first or "open" position. As illustrated, the disk 714 is coupled to the restrictor lever arm 712 by an axel or shaft 724, which is disposed along an axis of rotation. The axis of rotation is the same for the butterfly disk 714 and the restrictor lever arm 712.

Figure 8A:
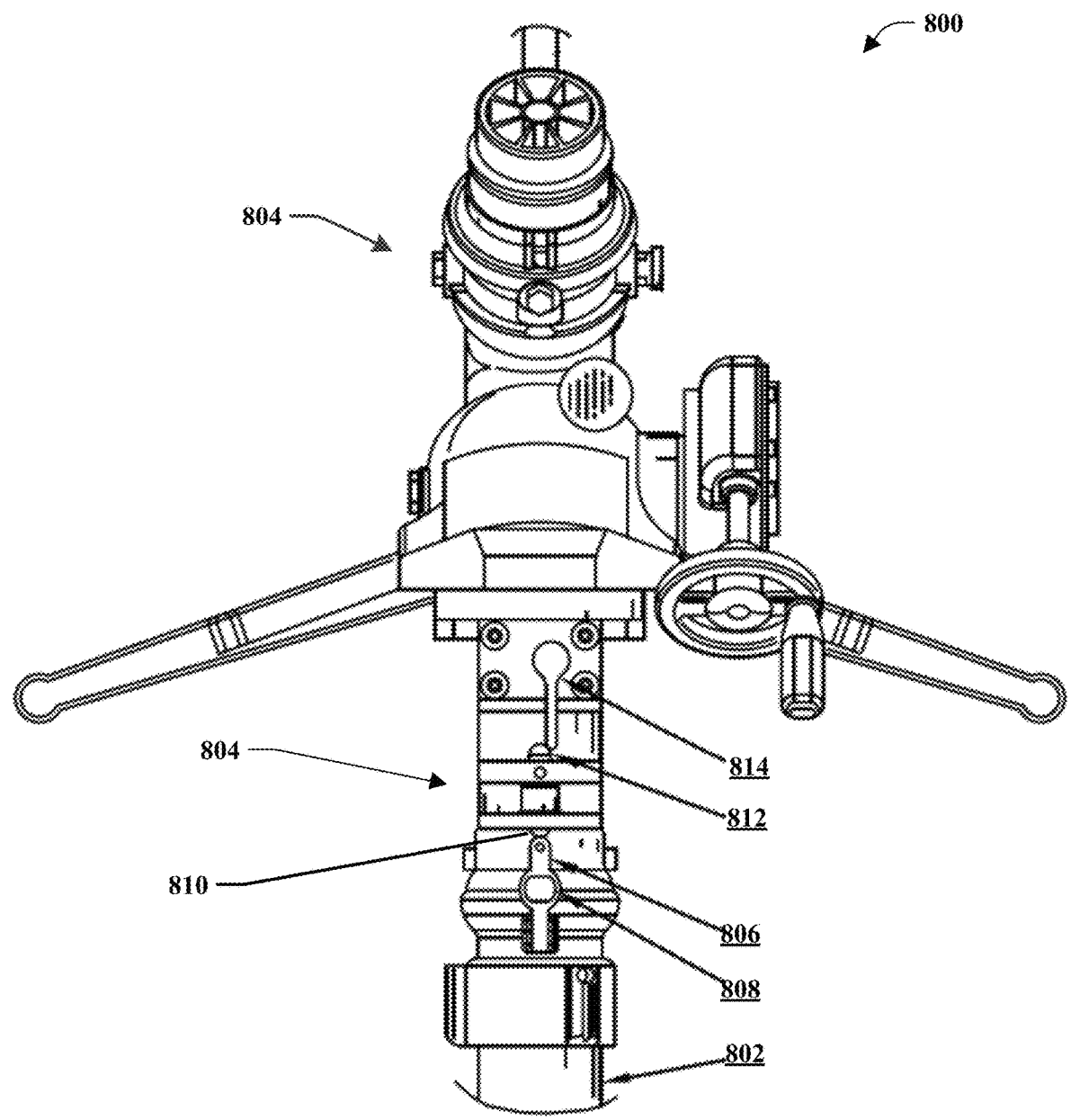
FIGS. 8A and 8B are component diagrams illustrating one implementation of one or more portions of one or more systems described herein.
Figure 8B:
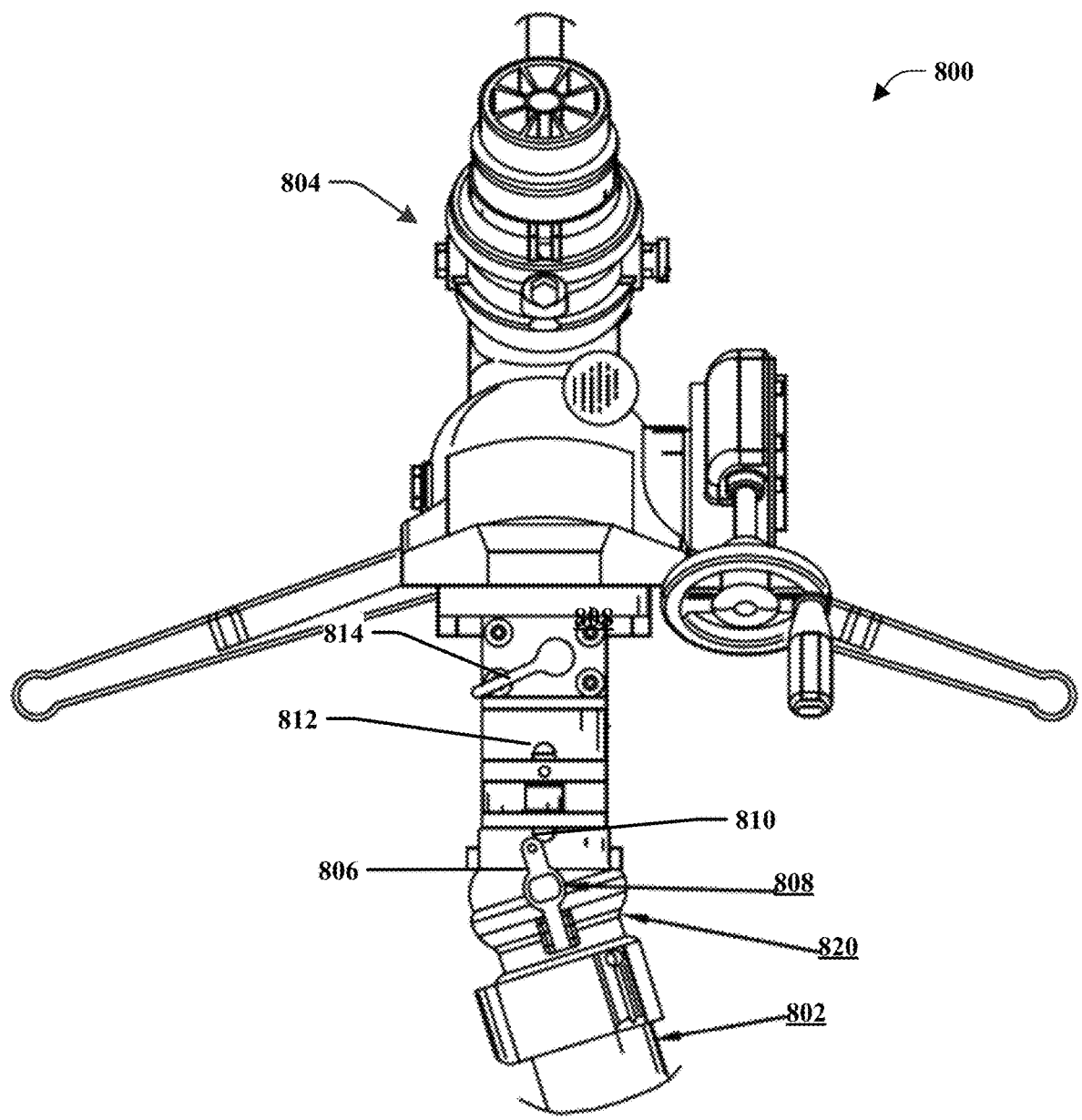

FIGS. 8A and 8B are component diagrams that illustrate an example of the systems, described herein, in use. In this example, FIG. 8A depicts and exemplary system 800 disposed in an operable condition that allows unrestricted fluid flow from the inlet 802 to the monitor body 804. Further, in this example, FIG. 8B depicts the exemplary system 800 disposed in a triggered condition that restricts fluid flow between the inlet 802 to the monitor body 804. In this example, the portable monitor can be coupled with a control tether (e.g., 156 of FIG. 1A), as may be positioned during use. Further, in this example, the monitor can be coupled with a fire hose to supply fluid (e.g., water) to the monitor.

In this example, one or more portions of the control system 800, described herein, are disposed between the fire hose and the body of the portable monitor 804. The example, system 800 can comprise a monitor inlet 802, which may be pivotably coupled with the trigger body 804, and operably coupled with the fire hose. Further, the example system 800 can comprise the trigger arm 806 pivotably engaged with a trunnion 808. Further, the trigger arm 806 can be fixedly engaged with the monitor inlet 802. In this example, in FIG. 8A, the distal end of the trigger arm 806 is operably, selectably engaged with the proximal end of the trigger pin 810. In this arrangement, the biasing component disposed in the trigger body housing 804, may be disposed in a compressed condition, due to the engagement of the trigger arm 806 with the trigger pin 810. Additionally, the distal end of the trigger pin 812 is extended from the distal end of the trigger body 804. In this configuration, the distal end of the trigger pin 812 acts as a stop for the restrictor arm lever 814, such that it is stopped from rotation (e.g., in this depiction, in a clockwise direction). In that way, for example, the butterfly disk (not shown) is disposed in an open position (e.g., first position), allowing substantially unabated fluid flow between the hose and the monitor body.

As illustrated in FIG. 8B, the exemplary system 800 is disposed in a tripped or activated condition. In this example, movement of the monitor 804 may result in the hose/inlet connection to pivot 820 (e.g., rotate about the vertical or horizontal axe). In this example, the pivoting at this junction can result in rotation of the trigger arm 806, disengaging it from the trigger pin 810. As described, when the trigger arm 806 is disengaged, the biasing force applied to the trigger pin 810 will cause the trigger pin to retract into the trigger body 804, thereby removing the lever stop for the restrictor lever arm 814. As described above, due to the force of the fluid flow, without the lever stop, the butterfly disk will rotate to its default or closed position (e.g., second position). As a result, the restriction provided by the butterfly disk results in a reduction in flow (e.g., and therefore opposing reaction force), which may result in mitigation of the movement of the monitor, for example. As illustrated in FIG. 8B, the monitor and exemplary control trigger system is shown in the tripped condition. This illustrative example depicts the assembly after a monitor rotation relative to the hose has occurred.

The exemplary system, as described herein, can be used as described, to merely reduce the flow of water to the point where the reaction force is reduced, to mitigate the change of position and/or target of the monitor. In this implementation, the pressure surge associated with the sudden reduction of flow is reduced to a desired level.

In an alternate implementation, the control system, described herein, may be configured to automatically stopping the flow entirely. In this implementation, a means of reducing the potential pressure spike may be utilized, separately. Further, in this implementation, a means may be provided to allow the firefighter to manually reduce the flow, while not disabling the control trigger mechanism described.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof

What is claimed is:

1. A device for improving control of a portable fluid monitor, comprising:
   a control device housing operably disposed between, and fluidly coupled with, a portable monitor fluid inlet in a pivotable arrangement, and with a proximal end of a portable monitor body;
   a trigger pin operably disposed in the control device housing, the trigger pin normally biased toward the portable monitor fluid inlet by a biasing component, the trigger pin sized to extend out of the control device housing;
   a trigger fixedly engaged with the portable monitor fluid inlet, a distal end of the trigger operably engagable with a proximal end of the trigger pin to place the trigger pin in a set position that extends a distal end of the trigger pin from a distal end of the control device housing to provide a control arm stop;
   a restrictor component operably disposed between the portable monitor fluid inlet and the portable monitor body, the restrictor component comprising:
      a flow restrictor disposed in a path of fluid flow;
      an axel shaft fixedly coupled with the flow restrictor and disposed along an axis of rotation that is substantially perpendicular to the direction of fluid flow; and
      a control arm fixedly engaged with the axel shaft and having a center of rotation at the axis of rotation, the control arm stopped from rotation by engaging the distal end of the trigger pin when the trigger pin is disposed in the set position, and allowed to rotate when the trigger pin is disposed in a triggered position, the triggered position occurring when the trigger is pivoted away from the set position.

2. A system for improving control of a portable fluid monitor, comprising:

a trigger body operably disposed and fluidly coupled with a portable monitor fluid inlet in a pivotable arrangement;

a trigger pin operably disposed in the trigger body, the trigger pin normally biased toward the portable monitor fluid inlet by a biasing component, the trigger pin sized to extend out of the trigger body;

a trigger arm fixedly engaged with the portable monitor fluid inlet, a distal end of the trigger arm operably engagable with a proximal end of the trigger pin to place the trigger pin in a set position that extends a distal end of the trigger pin from a distal end of the trigger body to provide a restrictor lever arm stop;

a restrictor component operably disposed between the trigger body and portable monitor body, the restrictor component comprising:

a flow restrictor disposed in a path of fluid flow;

an axel shaft fixedly coupled with the flow restrictor and disposed along an axis of rotation that is substantially perpendicular to the direction of fluid flow; and a restrictor lever arm fixedly engaged with the axel shaft and having a center of rotation at the axis of rotation, the restrictor lever arm stopped from rotation by engaging the distal end of the trigger pin when the trigger pin is disposed in the set position, and allowed to rotate when the trigger pin is disposed in a triggered position, the triggered position occurring when the trigger arm is pivoted away from the set position.

3. The device of claim 1, wherein the control arm is operably engaged with the flow restrictor to move the flow restrictor between an open position, permitting fluid flow, and a closed position, restricting fluid flow based on whether the trigger pin is disposed in the set position or the triggered position.

4. The device of claim 1, further comprising a manual control knob to reset the device upon set up and/or after activation when the trigger pin is disposed in the triggered position.

5. The device of claim 1, further comprising an indicator which provides a visual indication when the device is in the set position and when the device is in the triggered position.

6. The device of claim 1, further comprising a trunnion operably coupled, and pivotably engaged with the trigger at a base portion of the trigger to permit the trigger to rotate relative to the portable monitor fluid inlet.

7. The device of claim 1, wherein the biasing component comprises a spring, clip, or other force application component.

8. The device of claim 1, further comprising an engagement component positioned at the distal end of the trigger that is operably engageable with the proximal end of the trigger pin.

9. The device of claim 1, wherein when the portable monitor fluid inlet pivots from a centrally aligned arrangement with the control device housing, the trigger is configured to pivot away from the set position.

10. The system of claim 1, wherein the flow restrictor comprises a valve.

11. The system of claim 10, wherein the valve comprises a butterfly valve.

12. The system of claim 2, wherein the biasing component comprises a spring, clip, or other force application component.

13. The system of claim 2, wherein the biasing component is operably disposed in the trigger body and operably engaged with the trigger pin to bias the trigger pin toward the portable monitor fluid inlet.

14. The system of claim 2, further comprising a trunnion operably coupled with the trigger arm at a central portion of the trigger arm.

15. The system of claim 14, wherein the trigger arm is centrally, pivotably engaged with the trunnion to facilitate rotation of the trigger arm relative to the trigger body.

16. The system of claim 2, further comprising an engagement component positioned at the distal end of the trigger arm that is operably engageable with the proximal end of the trigger pin.

17. The system of claim 2, wherein when the portable monitor fluid inlet pivots from a centrally aligned arrangement with the trigger body, the trigger arm is configured to pivot away from the set position.

18. The system of claim 2, wherein the flow restrictor comprises a valve.

19. The system of claim 2, further comprising a torsion spring operably engaged with the flow restrictor to apply a biasing force to the flow restrictor.

20. They system of claim 2, wherein the restrictor lever arm is operably engaged with the flow restrictor to move the flow restrictor between an open position, permitting fluid flow, and a closed position, restricting fluid flow based on whether the trigger pin is disposed in the set position or the triggered position.

* * * * *